United States Patent [19]

Moody et al.

[11] 4,189,918

[45] Feb. 26, 1980

[54] DEVICES FOR EXTRACTING ENERGY FROM WAVE POWER

[75] Inventors: George W. Moody, East Kilbride; Robert A. Meir, Cambustang, both of Scotland

[73] Assignee: The Secretary of State for Energy in Her Britannic Majesty's Government of the United Kingdom of Great Britain and Northern Ireland, London, England

[21] Appl. No.: 933,671

[22] Filed: Aug. 14, 1978

[51] Int. Cl.² .............................................. F03B 13/12
[52] U.S. Cl. ....................................... 60/398; 290/53; 405/76; 417/330
[58] Field of Search .................... 60/398, 495, 502; 290/42, 53; 405/76; 417/100, 330, 331, 332, 337

[56] References Cited

U.S. PATENT DOCUMENTS

| | | | |
|---|---|---|---|
| 568,117 | 9/1896 | Price | 60/398 |
| 3,928,967 | 12/1975 | Salter | 60/495 X |
| 4,009,396 | 2/1977 | Mattera et al. | 290/53 |
| 4,139,984 | 2/1979 | Moody et al. | 60/398 |

OTHER PUBLICATIONS

Paper by D. V. Evans, Entitled "A Theory for Wave Power Absorption by Oscillating Bodies", 11th Symposium on Naval Hydrodynamics, vol. 5, 1976, pp. 15–27.

Primary Examiner—Edgar W. Geoghegan
Attorney, Agent, or Firm—Larson, Taylor & Hinds

[57] ABSTRACT

The invention provides a device for extracting energy from waves on a liquid upon which the device is adapted to float. The device is allowed to move in response to the waves, and has a shape below the surface of the liquid, position of center of gravity, and value of radius of gyration about the center of gravity, in a vertical plane aligned in the direction of propagation of the waves, adapted so that the device in response to the waves inhibits to a substantial extent the transmission and/or reflection of waves by the device itself.

8 Claims, 12 Drawing Figures

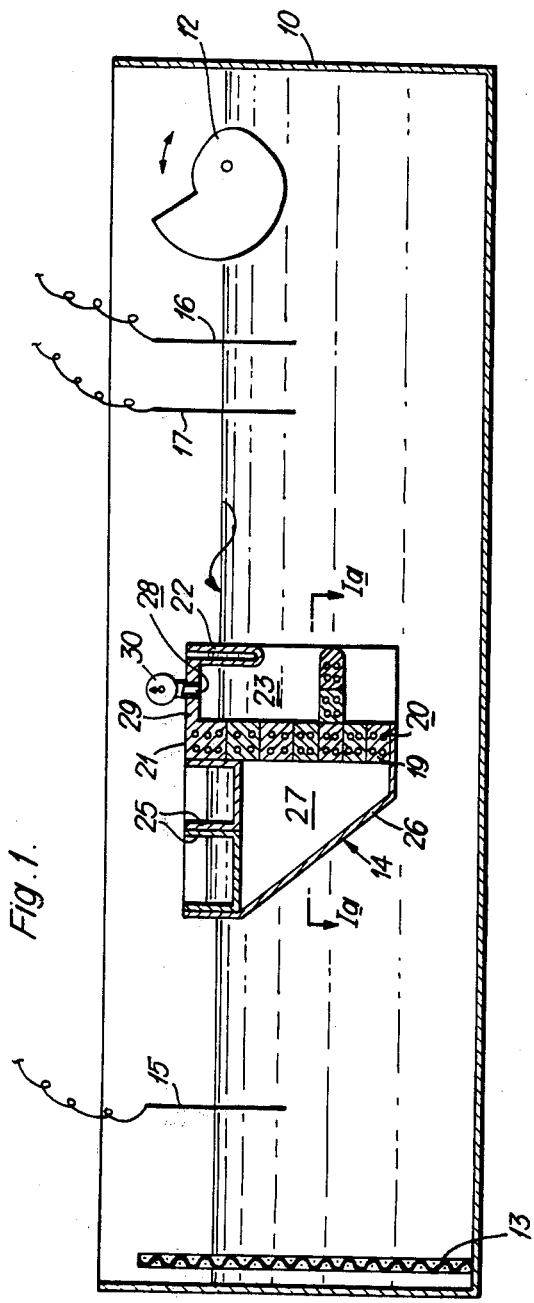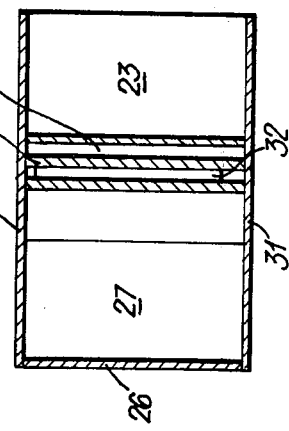

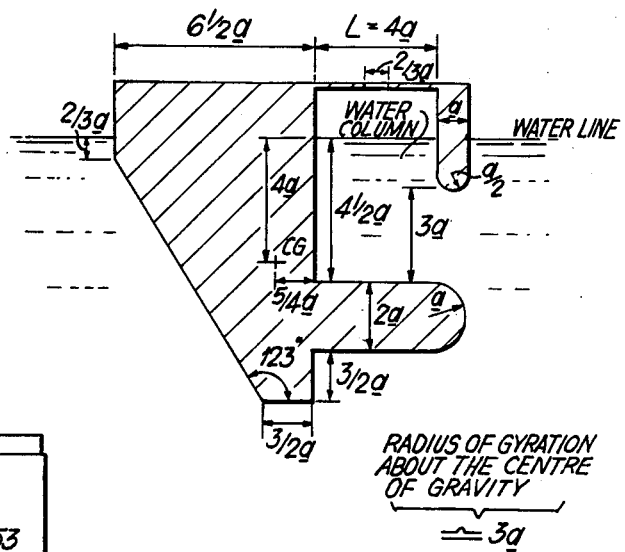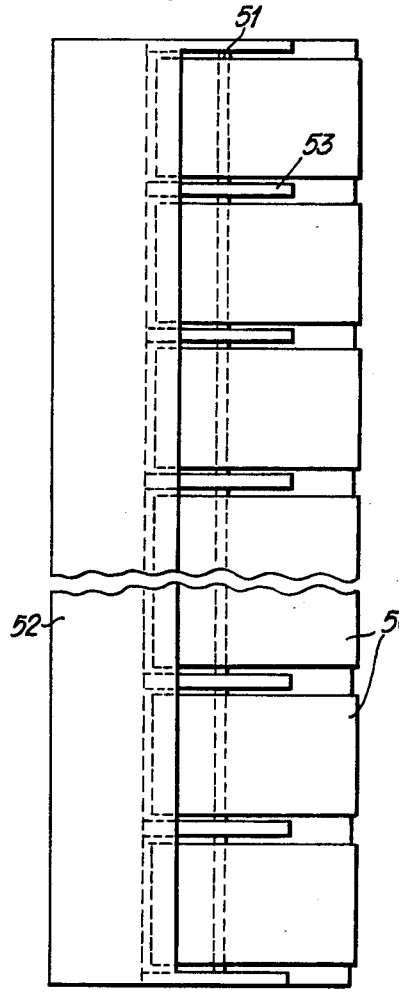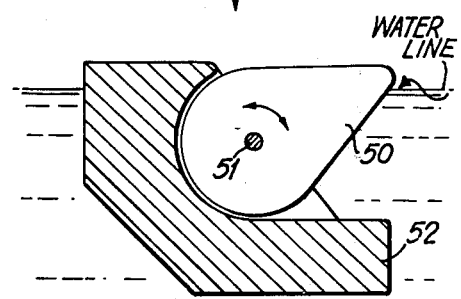

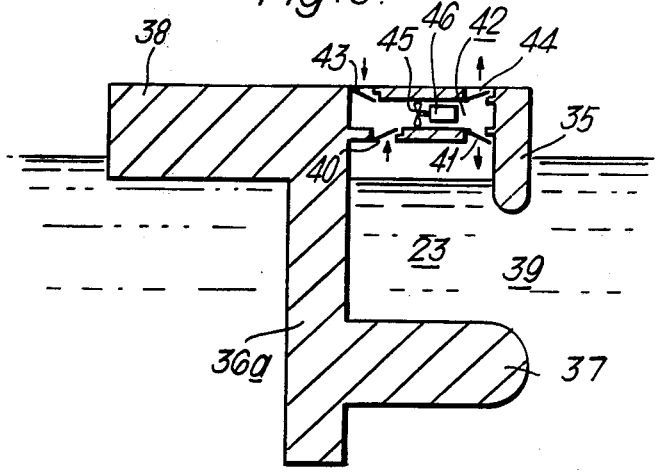
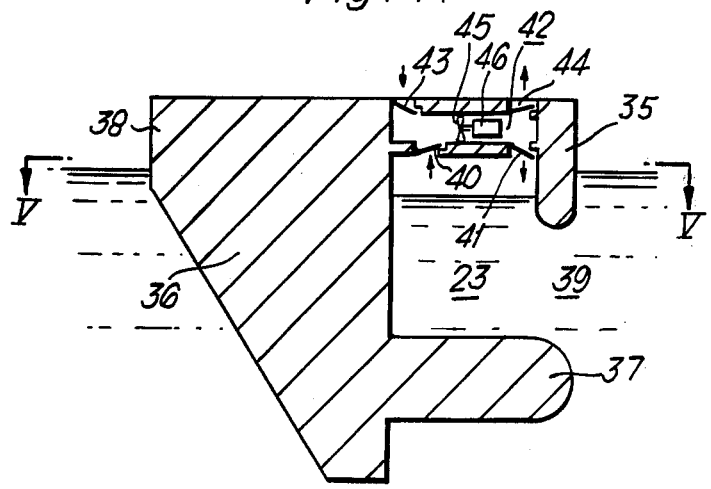

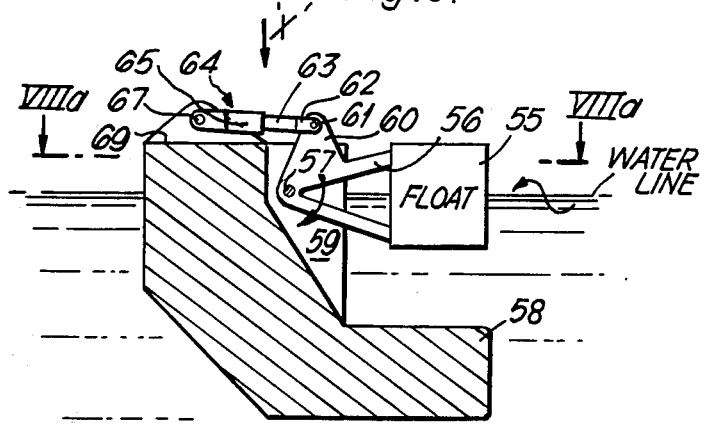
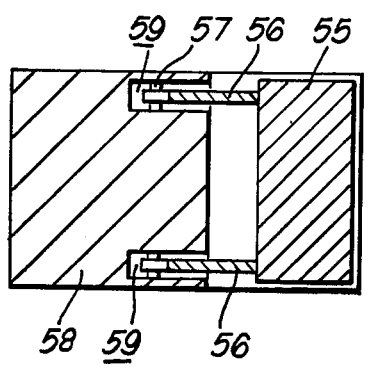
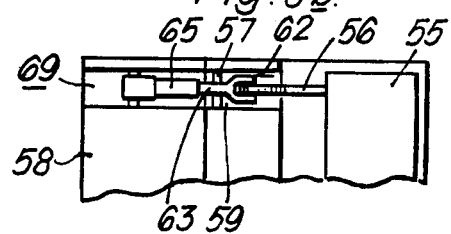

DEVICES FOR EXTRACTING ENERGY FROM WAVE POWER

This invention relates to devices for extracting energy from wavepower.

Some examples of buoy devices adapted to extract energy from wavepower are provided by the device invented by Yoshio Masuda and described in British Patent Specification No. 1,014,196 which is incorporated by reference herein, and the devices described in U.S. application Ser. No. 824,832 (now U.S. Pat. No. 4,139,984), these devices being arranged to extract energy from the waves through the oscillations of a column of liquid which is arranged to perform useful work.

Other examples of devices for extracting energy from wavepower are the Salter "Duck" the subject of British Patent Specification No. 1,482,085 and the "raft" device proposed by Sir Christopher Cockerell FRS the subject of British Patent Specification No. 1,448,204.

One of the difficulties that is met in providing devices for extracting energy from wavepower is in achieving a worthwhile energy extraction efficiency. The present invention is, therefore, concerned with trying to improve the energy extraction efficiency of such devices for some applications.

According to the present invention, there is provided a device for extracting energy from waves on a liquid upon which the device is adapted to float, the device being allowed to move in response to said waves in a vertical plane aligned in the direction of propagation of waves incoming towards the device, and having a shape of that portion of the device to be below the surface of the liquid, position of centre of gravity, and value of radius of gyration about the centre of gravity, in said plane adapted so that the motion of the device in response to said waves inhibits to a substantial extent the transmission and/or reflection of waves by the device itself.

Preferably, the device is optimised with respect to energy extraction to operate within a particular spectrum of wavelengths of the waves.

The device may extract energy from the waves through the oscillations of a column of the liquid in the device which is arranged to perform useful work such as driving air either through an air turbine which is adapted to drive an electric generator, or through an orifice so as to dissipate energy in flowing therethrough whereby the device can operate as a breakwater.

The device may comprise at least two components, and relative movement of said components in response to the waves may be used to extract energy from the waves.

One of the components may comprise a Salter "Duck" the subject of British Patent Specification No. 1,482,085.

Alternatively the two components may comprise a device in the form of a raft.

A stationary floating device which has a symmetrical underwater shape in a vertical plane aligned in the direction of waves incoming towards the device will have a theoretical power absorption of about 50% of the energy of the incoming waves ignoring losses which are inevitably associated with a practical device, the remaining wave energy being lost and distributed equally between waves transmitted by or reflected by the device itself.

A device with an underwater shape and weight distribution according to the invention is so arranged that it can execute a particular combination of translational and/or rotational motions in the above mentioned vertical plane such that any waves produced by these motions and by the device in extracting energy from the waves cancel each other out so as to inhibit the transmission and reflection of waves by the device itself.

For such a floating device there are numerous underwater shapes that may be used with an appropriate position of centre of gravity, and value of radius of gyration about the centre of gravity, and once these have been determined they may be applied proportionally to suit a particular device so as to optimise the performance of the device in extracting energy from the waves. This enables suitable underwater shapes, and a corresponding position of centre of gravity and value of radius of gyration to be determined by use of models in a wave tank.

The invention will now be described by way of example only with reference to the accompanying drawings, in which:

FIG. 1 shows in diagrammatic sectional elevation an apparatus for testing models of floating devices;

FIG. 1a shows to an enlarged scale a sectional view on the line Ia—Ia of FIG. 1;

FIG. 2 shows in diagrammatic sectional elevation an outline of the optimum parameters of one floating device;

FIG. 4 shows a diagrammatic sectional representation of a device for extracting energy from waves and having the parameters of the device of FIG. 2;

FIG. 6 shows a diagrammatic sectional representation of a device for extracting energy from waves and having the parameters of the device of FIG. 3;

FIG. 7 shows in diagrammatic sectional elevation an alternative floating device to the devices shown in FIGS. 2 to 6;

FIG. 7a shows a view in the direction of arrow 'A' of FIG. 7;

FIG. 8 shows another alternative floating device to that shown in FIGS. 2 to 6;

FIG. 8a shows a sectional view on the line VIIIa—VIIIa of FIG. 8; and

FIG. 8b shows a fragmentary view in the direction of arrow 'X' of FIG. 8.

Figure 3:
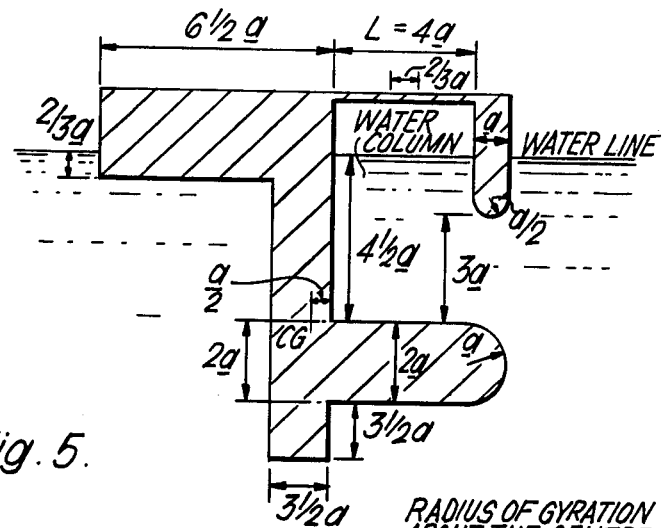
FIG. 3 shows in diagrammatic sectional elevation an outline of the optimum parameters of another floating device.

Referring to FIG. 1, the apparatus shown is of rectangular form in plan and comprises a tank 10 partially filled with water and having at one end a wave making device 12 in the form of a cam shaped vane which is arranged to be oscillated (by means not shown) to propagate waves along the tank 10. A wave absorber 13 of expanded metal for preventing waves from being reflected therefrom is disposed at the other end of the tank 10. A model 14 of a floating device to be tested is disposed in the tank 10, and a wave height gauge 15 disposed near the wave absorber 13 to detect waves transmitted by the model 14. Two wave height gauges 16 and 17 separated by a distance equal to one quarter of the wavelength are disposed between the wave making device 12 and the model 14 in order to detect the wave generated by the wave making device 12 and the wave reflected by the model 14.

The model 14 is constructed from numerous vertically disposed wooden blocks 19 each having four apertures 20 and joined together. The upper portion of the model 14 is provided by a shaped wooden block 21 joined to the uppermost of the blocks 19 and having a downwardly extending hollow portion 22 with a rounded end and which defines the upper part of a chamber 23 in which a pocket of air is trapped by a column of water. The base of the chamber 23 is defined by horizontally extending blocks 19 the outermost one of which is provided with a rounded end.

Two containers 25 are joined together and secured to the shaped block 21, and an aluminium sheet 26 is joined to and extends between the containers 25 and the lowermost of the vertically disposed blocks 19 to define a cavity 27. An orifice 28 in a bridging portion 29 of the shaped block 21 communicates with the chamber 23 and has a pressure gauge 30 connected thereto at the other side from the chamber 23.

Referring now to FIG. 1a, perspex panels 31 are disposed one each side of the model 14 but need not be in sealing engagement therewith so that water may enter the cavity 27. Metal rod-like weight 32 (only one is shown) are disposed in some of the apertures 20 to provide a required weight distribution about the model. Referring again to FIG. 1, water in the containers 25 and the hollow portion 22 of the shaped block 21 supplement the weights 32 in achieving the required weight distribution from which the position of the centre of gravity, and value of radius of gyration about the centre of gravity can be determined.

To test the model 14, the wave making device 12 is operated to propagate waves incoming towards and incident on the model 14, the height of these incoming waves being indicated by the incident wave height gauge 16. The water in the chamber 23 oscillates from the effect of these incident waves on the model 14, and the energy extracted from the incident waves is determined by the pressure indicated by the pressure gauge 30.

The height of any waves transmitted by the model 14 is determined by the transmitted wave height gauge 15 and similarly the height of any waves reflected by the model 14 is determined by a comparison of wave heights indicated by the wave height gauges 16 and 17 respectively.

The shape of the model 14 and the distribution of its weight are then changed by removing, adding or redistributing the blocks 19, weights 32, and containers 25, and changing the quantity of water in the containers 25 and the hollow portion 22, with if necessary a change in shape of the aluminium sheet 27. This reshaped model 14 is then retested in the manner described above, and successively several reshaped models 14 are retested. The reshaped model 14 that provides the best results i.e. lowest height of the transmitted and reflected waves, is selected as the closest to the optimum, and its proportions, weight distribution, centre of gravity, and radius of gyration calculated so that they can be applied proportionally to suit a particular application.

Models 14 similar to the model shown in FIGS. 1 and 1a have been tested as described above, and the resulting optimum proportions of underwater shape, position of centre of gravity, and value of radius of gyration about the centre of gravity determined, as shown in FIG. 2 and FIG. 3 to which reference is now made.

In FIG. 2, the model 14 shown in diagrammatic sectional elevation is annotated with the correlation of the dimensions of the underwater shape, the position of the centre of gravity of the model 14 and its radius of gyration about the centre of gravity, the means height of the water in the chamber, the water line and the wavelength of the incident waves.

The dimension 'L' in FIG. 2 relates to the wavelength of the incident waves and it is desirable to use the proportions of FIG. 2 and FIG. 3 in applications where 'L' $\simeq$ 1/10 of the wavelength of the incident waves. The wavelength of the incident waves on the model 14 in the tank 1 of FIG. 1 can be changed by changing the frequency of oscillation of the wave making device 12 to enable the model 14 to be tested over the band of wavelengths for which the practical device might be used.

The model 14 of FIG. 2 was found to convert approximately 75% of the energy of the incident waves into useful work, approximately 5% as transmitted waves, and approximately 5% as reflected waves, the remaining 15% of the energy being dissipated through losses in the operation of the model. The freeboard above the water line is unimportant except in relation to the position of the centre of gravity and the value of the radius of gyration. It will be understood that for a practical device values as low as 5% for the transmitted and reflected waves constitute a significant reduction in the losses associated with such devices.

In FIG. 3, the model 14 shown is similar to the model 14 of FIG. 2 and is annotated in a similar manner. However, the displacement of the model 14 of FIG. 3 is much reduced compared with the model 14 of FIG. 2 with only a marginally reduced effect on its efficiency in extracting energy from waves.

The proportions shown in FIG. 2 and FIG. 3 may be adopted by devices for particular applications.

The model 14 of FIG. 1 and the shapes shown in FIG. 2 and FIG. 3 relate to devices which rely on the oscillations of a column of water to extract energy from incident waves by pressurising a gas, such as air, above the water column and discharging it through an orifice, either to a mechanical device such as a turbine, or in selecting the size of the orifice 28 so that energy is lost in flowing therethrough and the device functions as a breakwater. The proportions of the orifice shown in FIG. 2 and FIG. 3 relate to an orifice used in such a breakwater device. Examples of devices which extract energy from waves by use of the oscillations of a column of water are described in the aforementioned British patent specification No. 1,014,196 and U.S. application Ser. No. 824,832, and a device incorporating the invention and operating on the use of an oscillating water column to extract energy from waves is shown in FIG. 4 to which reference is now made.

The device shown in FIG. 4 is of buoyant construction and has the proportions and weight distribution of FIG. 2 in a vertical plane aligned in the direction of propagation of waves on a liquid (e.g. seawater) in which the device is shown floating. The device has a forward wall 35, a shaped rear wall 36, a lower end wall 37, and an upper portion 38 which closes a chamber 23 between the forward wall 35 and rear wall 36. A port 39 between the bottom of the forward wall 35 and the lower end wall 37 allows the liquid to flow into and out of the chamber 23 with the motion of the waves on the surface of the liquid.

A rectifying valve arrangement is provided by a non-return valve air inlet 41 into the chamber 23 and a non-return valve air outlet 40 from the chamber 23, which connect to an air duct 42 having a non-return valve air inlet 43 from the atmosphere and a non-return valve air outlet 44 to the atmosphere. An air turbine 45 is disposed in the air duct 42 and is connected to an electric generator 46 so as to drive the electric generator 46 when air flows through the air duct 42.

Figure 5:
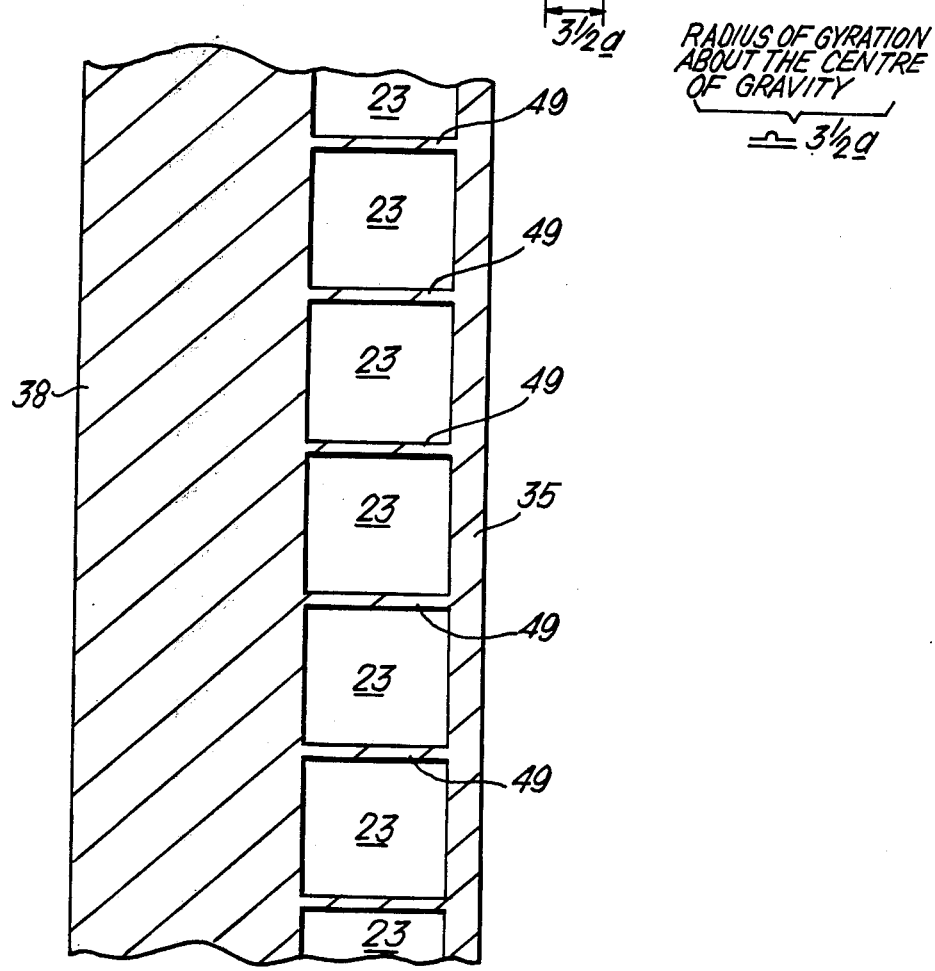
FIG. 5 shows a sectional view on the line V—V of FIG. 4.

The device is of elongate form in a direction parallel to the waves as shown in FIG. 5 to which reference is now made, and has side walls 49 to define a plurality of chambers 23 each being connected to a respective air turbine 45 (not shown) and electric generator 46 (not shown).

In operation of the device of FIGS. 4 and 5, oscillation of the liquid in the chamber 23 with the motion of the waves sucks air into the chamber 23 through air inlets 43 and 41 and subsequently expels air from the chamber 23 through the air outlets 40 and 44. The direction of the air flow in the air duct 42 is unidirectional as can be seen from the arrows which indicate air flow and, therefore, the air turbine 45 is driven during both the upward and the downward movement of the liquid in the chamber 23.

A device similar in most respects to the device shown in FIG. 4 and FIG. 5, but having the proportions and weight distribution of FIG. 3 is shown in FIG. 6 to which reference is now made. Although the device of FIG. 6 is provided with a parallel sided rear wall 36a instead of the triangular shaped rear wall of the device shown in FIG. 4, it operates in an identical manner to that described in relation to the device of FIG. 4 to extract energy from waves.

It will be understood that although the non-return valves for the air inlets 43 and 41, and air outlets 40 and 44 have been shown in FIG. 4 and FIG. 6 as having single obturators, a plurality of obturators (not shown) in parallel may be used depending on the dimensions of the air inlet 43 or 41, or air outlet 40 or 44.

An important aspect of the above described invention is that all the major cyclic forces acting on the device including the body forces in the vertical plane aligned with the direction of propagation of the waves should be substantially in balance, there being no external restraints.

Although the invention has been described in relation to a device in which the oscillations of a column of water are used to extract energy from incident waves, the invention may also be incorporated with other devices used to extract energy from incident waves, for example devices in which the output is derived from movement of one component relative to another component such as the Salter "Duck" device the subject of British Patent Specification No. 1,482,085, and the Cockerell raft device the subject of British Patent Specification No. 1,448,204, respectively, which are incorporated by reference herein.

Referring now to FIGS. 7 and 7a, and arrangement is shown in which several Salter "Ducks" 50 are mounted on a rod 51 which is supported by a floating carrier device 52. The carrier device 52 has a number of partitions 53 disposed in parallel array along the carrier device 52 to support the rod 51. By appropriate tests on the shape and radius of gyration of the combined carrier device 52 and Salter "Duck" 50 in the manner described in relation to the apparatus of FIG. 1, a shape, position of centre of gravity, and value of radius of gyration about the centre of gravity, might be determined which minimise the waves transmitted and reflected from the combined carrier device 52 and Salter "Duck" 50 and therefore maximise the energy that can be extracted from incident waves by the nodding of the Salter "Duck" in response to these waves. It will be understood that a relatively short carrier device 52 might be used with only several or even a single Salter "Duck" 50 thereon, and although the Salter "Duck" 50 would describe translational movements with the carrier device 52, in response to incident waves, the Salter "Duck" 50 would still have a relatively high wave energy extraction efficiency because of the choice of shape of the carrier device 52 combined with the Salter "Duck" 50 and the position of centre of gravity, and value of radius of gyration thereof in accordance with the invention. For details of the Salter "Duck" 50 attention is directed to the referenced British Patent specification No. 1,482,085.

Referring now to FIGS. 8 and 8a and 8b, the essential features are shown of a raft type of device for extracting energy from incident waves similar in principle to the Cockerell raft, the device being provided by a float 55 pivotally attached by two 'A' frames 56 which are each connected to a pivot rod 57 extending across a slot 59 in an angular shaped upper surface of a carrier raft 58. Each 'A' frame 56 has an upstanding lug 60 and provides an anchorage for a pivot rod 61 to which a forked end 62 of a piston rod 63 of a hydraulic piston pump 64 is pivotally connected. A cylinder member 65 of the pump 64 is pivotally connected to a pivot rod 67 located in the carrier raft 58 so as to extend across a slot 69 in the upper surface of the raft 58.

In operation, relative motion between the float 55 and the carrier raft 58 in response to incident waves is utilised to perform mechanical work by pumping hydraulic fluid in the pump 64 through a hydraulic circuit (not shown).

As described in relation to the Salter "Duck", a shape, position of centre of gravity, and value of radius of gyration about the centre of gravity, might be determined to minimise the transmitted and reflected waves from the device of FIGS. 8 to 8b so as to maximise the energy it extracts from the incident waves. An elongate device having numerous floats 55 connected in parallel relationship to a single carrier raft 58 may be used in a similar manner to that described in relation to the Salter "Duck" of FIG. 7a.

It will be understood that although the devices of FIGS. 2 to 8 have been shown of solid construction, appropriate cavities may be incorporated to provide buoyancy, and to assist in arranging the necessary position of the centre of gravity, and value of radius of gyration about the centre of gravity.

The wave height gauges 14, 15 and 16 used in the apparatus of FIG. 1 are those conventionally used for determining wave height.

In the foregoing description of the invention, it will be understood that translational movement of the device refers to vertical movement and/or horizontal movement in the vertical plane aligned in the direction of incoming waves. Such movements are also known as heave and surge respectively, the rotational movement in this vertical plane being otherwise known as pitch. Some movement transverse to this plane might also take place at the same time as the aforedescribed movements in the said plane. If the device is relatively long in a direction perpendicular to this vertical plane compared with the length of the device between fore and aft in the vertical plane, the movement of the device in response to waves is substantially two dimensional in the aforesaid vertical plane.

The present invention further provides a device for extracting energy from waves on a liquid upon which the device is adapted to float, the device being arranged to respond to said waves with such a combination of heave, surge, and pitch as to inhibit to a substantial extent the transmission and/or reflection of waves by the device itself.

We claim:

1. A device for extracting energy from waves on a liquid upon which the device is adapted to float, wherein the improvement comprises,
   (a) the device being free to move in response to said waves in a vertical plane aligned in the direction of propagation of the waves incoming towards the device, and
   (b) that portion of the device adapted to be below the surface of the liquid being of asymmetric shape in said vertical plane; said shape, the position of the centre of gravity of the device, and the value of the radius of gyration about the centre of gravity in said plane being arranged so that the motion of the device in response to said waves inhibits to a substantial extent the transmission and reflection of waves by the device itself.

2. A device as claimed in claim 1, wherein the device comprises,
   (a) at least two components movable relative to each other in response to said waves;
   (b) means for using energy extracted from said waves; and
   (c) means for connecting said energy using means to the components, so that the relative movement between the components drives the energy using means.

3. A device for extracting energy from waves on a liquid upon which the device is adapted to float, the device having a chamber with an opening for the flow of the liquid into and out of the chamber to provide a quantity of the liquid which is arranged to oscillate in the chamber from the motion of the waves, and means arranged to extract some of the energy of the oscillating liquid in the chamber, wherein the improvement comprises,
   (a) a lower end wall to close the lower end of the chamber;
   (b) a rear wall of the chamber with respect to incident waves incoming towards the device;
   (c) a forward wall of the chamber with respect to said incident waves and shaped to define at least in part said opening;
   (d) side walls of the chamber;
   the shape of that portion of the device adapted to be below the surface of the liquid, the position of the centre of gravity of the device, and the value of the radius of gyration of the device in a vertical plane aligned in the direction of propagation of the waves being arranged so that the motion of the device in said plane in response to said waves inhibits to a substantial extent the tramsmission and reflection of waves by the device itself.

4. A device as claimed in claim 3, wherein
   (a) the forward wall is shaped to provide a rounded lower end,
   (b) the lower end wall is shaped to provide a rounded forward end thereof with respect to incoming waves, and
   (c) the rear wall extends below the lower end wall.

5. A device as claimed in claim 3, wherein the rear wall is shaped to provide a cross-section in said plane which decreases with the depth of immersion of said wall.

6. A device as claimed in claim 3, wherein the means to extract some of the energy from the liquid comprises an air turbine drivably coupled to an electric generator and disposed in a substantially horizontal duct provided above the chamber, and there are provided,
   (a) an inlet non-return valve means for air from the atmosphere to an inlet end of the duct;
   (b) an inlet non-return valve means to the chamber at an outlet end of the duct for air flowing from the duct to flow into the chamber;
   (c) an outlet non-return valve means from the chamber at the inlet end of the duct for air to flow from the chamber into the duct, and
   (d) an outlet non-return valve means at the outlet end of the duct positioned so as to exhaust air to the atomsphere from the duct.

7. A device for extracting energy from waves on a liquid upon which the device is adapted to float, the device having a chamber with an opening for the flow of the liquid into and out of the chamber to provide a quantity of the liquid which is arranged to oscillate in the chamber from the motion of the waves, and means arranged to extract some of the energy of the oscillating liquid in the chamber, wherein the improvement comprises,
   (a) a lower end wall to close the lower end of the chamber;
   (b) a rear wall of the chamber with respect to incident waves incoming towards the device, said rear wall extending below the lower end wall;
   (c) a forward wall of the chamber with respect to said incident waves and shaped to define at least in part said opening;
   (d) side walls of the chamber;
   (e) the distance in the chamber between the surfaces of the forward wall and the rear wall with respect to the direction of propagation of the incoming waves being selected so as to be about:
   $1/10 \times$ wavelength of the incoming waves;
   (f) the lower end wall of the chamber being positioned to provide that the mean height of the liquid in the chamber is about:
   $9/80 \times$ wavelength of the incoming waves;
   (g) the opening having an upward dimension of about:
   $\frac{2}{3} \times$ mean height of the liquid in the chamber;
   (h) the centre of gravity of the device being about:
   $1/9 \times$ mean height of the liquid in the chamber from the lower end wall of the chamber, and
   $5/16 \times$ said distance in the chamber between the surfaces of the forward wall and the rear wall of the chamber and to the rear of said surface of the rear wall; and
   (i) the radius of gyration of the device about the centre of gravity being about:
   $\frac{3}{4} \times$ said distance in the chamber between the surfaces of the forward wall and the rear wall of the chamber,
   whereby, the motion of the device in response to said incoming waves in a vertical plane aligned in the direction of propagation of the waves inhibits to a substantial extent the transmission and reflection of waves by the device itself.

8. A modification of the device claimed in claim 7, wherein
(a) the centre of gravity of the device is at about the same height in the device as the closed lower end of the chamber, and to the rear of the rear wall of the chamber at a distance of about:
$\frac{1}{8}\times$ said distance in the chamber between the surfaces of the forward wall and the rear wall of the chamber, and to the rear of said surface of the rear wall, and
(b) the radius of gyration of the device is about:
$\frac{7}{8}\times$ said distance in the chamber between the surfaces of the forward wall and the rear wall of the chamber.

* * * * *